United States Patent
Boyapalle et al.

(10) Patent No.: US 11,914,725 B2
(45) Date of Patent: Feb. 27, 2024

(54) OPERATING SYSTEM AGNOSTIC AND SECURE BI-DIRECTIONAL DATA HANDLING

(71) Applicant: DELL PRODUCTS, LP, Round Rock, TX (US)

(72) Inventors: Anantha K. Boyapalle, Cedar Park, TX (US); Mario Limonciello, Austin, TX (US); Abeye Teshome, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 448 days.

(21) Appl. No.: 17/333,922

(22) Filed: May 28, 2021

(65) Prior Publication Data

US 2022/0382890 A1    Dec. 1, 2022

(51) Int. Cl.
  *G06F 21/60* (2013.01)
  *G06F 13/42* (2006.01)
  *H04L 9/40* (2022.01)

(52) U.S. Cl.
  CPC ........ *G06F 21/606* (2013.01); *G06F 13/4282* (2013.01); *H04L 63/0428* (2013.01); *G06F 2213/0042* (2013.01)

(58) Field of Classification Search
  CPC .............. G06F 21/606; G06F 13/4282; G06F 2213/0042; H04L 63/0428
  USPC ........................................................ 726/26
  See application file for complete search history.

(56) References Cited

U.S. PATENT DOCUMENTS

| | | | |
|---|---|---|---|
| 6,282,683 B1* | 8/2001 | Dapper ................. | H04L 5/1484 |
| | | | 714/752 |
| 10,073,753 B2 | 9/2018 | Boyapalle et al. | |
| 10,990,687 B2 | 4/2021 | Robison et al. | |
| 11,101,879 B2* | 8/2021 | Miller ................. | H04B 7/18582 |
| 11,272,250 B1* | 3/2022 | Buchner ................. | H04N 7/15 |
| 2015/0169330 A1* | 6/2015 | Maity ..................... | G06F 8/654 |
| | | | 713/1 |
| 2016/0182567 A1* | 6/2016 | Sood ....................... | H04L 63/10 |
| | | | 726/1 |
| 2017/0337813 A1* | 11/2017 | Taylor .................. | G05D 1/0285 |
| 2017/0337953 A1* | 11/2017 | Zawodny .............. | G06F 3/0659 |
| 2018/0129503 A1* | 5/2018 | Narayan ............ | H03K 19/0175 |
| 2018/0343238 A1* | 11/2018 | Tola .................... | H04L 63/0421 |
| 2019/0056984 A1 | 2/2019 | Teshome et al. | |
| 2021/0117249 A1* | 4/2021 | Doshi ................. | H04L 67/1001 |
| 2021/0133336 A1* | 5/2021 | Andrews ............... | G06F 21/602 |
| 2021/0135967 A1* | 5/2021 | Lorga .................. | H04L 41/0886 |

(Continued)

OTHER PUBLICATIONS

Dale Stansberry; DataFed: Towards Reproducible Research via Federated Data; IEEE; pp. 13121317.*

*Primary Examiner* — Monjur Rahim

(74) *Attorney, Agent, or Firm* — Larson Newman, LLP

(57) ABSTRACT

An information handling system includes a virtual interface configured to provide communication between an agent and an embedded controller, wherein the virtual interface is located below a kernel space of the information handling system. The agent may be configured to transmit telemetry data published by the embedded controller to a data repository, wherein the agent is located at a user space of the information handling system. The embedded controller publishes telemetry data to the data repository via the virtual interface through the agent.

20 Claims, 6 Drawing Sheets

(56) References Cited

U.S. PATENT DOCUMENTS

2022/0107912 A1* 4/2022 Wietfeldt ............ G06F 13/4282
2022/0382890 A1* 12/2022 Boyapalle ........... H04L 63/0442

* cited by examiner

OPERATING SYSTEM AGNOSTIC AND SECURE BI-DIRECTIONAL DATA HANDLING

FIELD OF THE DISCLOSURE

The present disclosure generally relates to information handling systems, and more particularly relates to operating system agnostic and secure bi-directional data handling.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus, information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

An information handling system includes a virtual interface configured to provide communication between an agent and an embedded controller, wherein the virtual interface is located below a kernel space of the information handling system. The agent may be configured to transmit telemetry data published by the embedded controller to a data repository, wherein the agent is located at a user space of the information handling system. The embedded controller publishes telemetry data to the data repository via the virtual interface through the agent.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Figure 1:
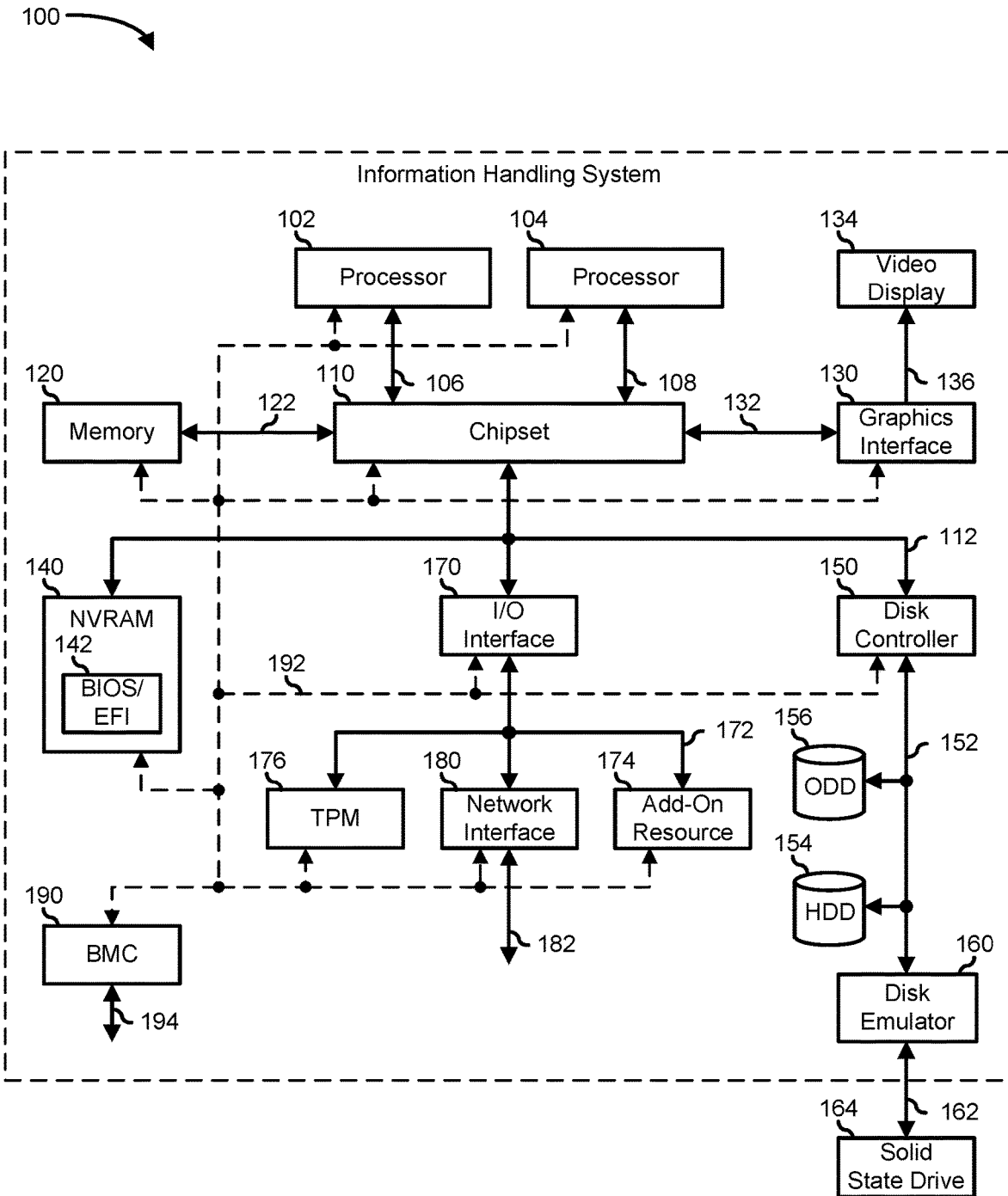
FIG. 1 is a block diagram illustrating an information handling system according to an embodiment of the present disclosure.

FIG. 1 illustrates an embodiment of an information handling system 100 including processors 102 and 104, a chipset 110, a memory 120, a graphics adapter 130 connected to a video display 134, a non-volatile RAM (NV-RAM) 140 that includes a basic input and output system/extensible firmware interface (BIOS/EFI) module 142, a disk controller 150, a hard disk drive (HDD) 154, an optical disk drive 156, a disk emulator 160 connected to a solid-state drive (SSD) 164, an input/output (I/O) interface 170 connected to an add-on resource 174 and a trusted platform module (TPM) 176, a network interface 180, and a baseboard management controller (BMC) 190. Processor 102 is connected to chipset 110 via processor interface 106, and processor 104 is connected to the chipset via processor interface 108. In a particular embodiment, processors 102 and 104 are connected together via a high-capacity coherent fabric, such as a HyperTransport link, a QuickPath Interconnect, or the like. Chipset 110 represents an integrated circuit or group of integrated circuits that manage the data flow between processors 102 and 104 and the other elements of information handling system 100. In a particular embodiment, chipset 110 represents a pair of integrated circuits, such as a northbridge component and a southbridge component. In another embodiment, some or all of the functions and features of chipset 110 are integrated with one or more of processors 102 and 104.

Memory 120 is connected to chipset 110 via a memory interface 122. An example of memory interface 122 includes a Double Data Rate (DDR) memory channel and memory 120 represents one or more DDR Dual In-Line Memory Modules (DIMMs). In a particular embodiment, memory interface 122 represents two or more DDR channels. In another embodiment, one or more of processors 102 and 104 include a memory interface that provides a dedicated memory for the processors. A DDR channel and the connected DDR DIMMs can be in accordance with a particular DDR standard, such as a DDR3 standard, a DDR4 standard, a DDR5 standard, or the like.

Memory 120 may further represent various combinations of memory types, such as Dynamic Random-Access Memory (DRAM) DIMMs, Static Random-Access Memory (SRAM) DIMMs, non-volatile DIMMs (NV-DIMMs), storage class memory devices, Read-Only Memory (ROM) devices, or the like. Graphics adapter 130 is connected to chipset 110 via a graphics interface 132 and provides a video display output 136 to a video display 134. An example of a graphics interface 132 includes a Peripheral Component Interconnect-Express (PCIe) interface and graphics adapter 130 can include a four-lane (x4) PCIe adapter, an eight-lane (x8) PCIe adapter, a 16-lane (x16) PCIe adapter, or another configuration, as needed or desired. In a particular embodiment, graphics adapter 130 is provided down on a system printed circuit board (PCB). Video display output 136 can include a Digital Video Interface (DVI), a High-Definition Multimedia Interface (HDMI), a DisplayPort interface, or the like, and video display 134 can include a monitor, a smart television, an embedded display such as a laptop computer display, or the like.

NV-RAM 140, disk controller 150, and I/O interface 170 are connected to chipset 110 via an I/O channel 112. An example of I/O channel 112 includes one or more point-to-point PCIe links between chipset 110 and each of NV-RAM 140, disk controller 150, and I/O interface 170. Chipset 110 can also include one or more other I/O interfaces, including a PCIe interface, an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. NV-RAM 140 includes BIOS/EFI module 142 that stores machine-executable code (BIOS/EFI code) that operates to detect the resources of information handling system 100, to provide drivers for the resources, to initialize the resources, and to provide common access mechanisms for the resources. The functions and features of BIOS/EFI module 142 will be further described below.

Disk controller 150 includes a disk interface 152 that connects the disc controller to a hard disk drive (HDD) 154, to an optical disk drive (ODD) 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits SSD 164 to be connected to information handling system 100 via an external interface 162. An example of external interface 162 includes a USB interface, an institute of electrical and electronics engineers (IEEE) 1394 (Firewire) interface, a proprietary interface, or a combination thereof. Alternatively, SSD 164 can be disposed within information handling system 100.

I/O interface 170 includes a peripheral interface 172 that connects the I/O interface to add-on resource 174, to TPM 176, and to network interface 180. Peripheral interface 172 can be the same type of interface as I/O channel 112 or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral interface 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on a separate circuit board or add-in card disposed within information handling system 100, a device that is external to the information handling system, or a combination thereof.

Network interface 180 represents a network communication device disposed within information handling system 100, on a main circuit board of the information handling system, integrated onto another component such as chipset 110, in another suitable location, or a combination thereof. Network interface 180 includes a network channel 182 that provides an interface to devices that are external to information handling system 100. In a particular embodiment, network channel 182 is of a different type than peripheral interface 172, and network interface 180 translates information from a format suitable to the peripheral channel to a format suitable to external devices.

In a particular embodiment, network interface 180 includes a NIC or host bus adapter (HBA), and an example of network channel 182 includes an InfiniBand channel, a Fibre Channel, a Gigabit Ethernet channel, a proprietary channel architecture, or a combination thereof. In another embodiment, network interface 180 includes a wireless communication interface, and network channel 182 includes a Wi-Fi channel, a near-field communication (NFC) channel, a Bluetooth® or Bluetooth-Low-Energy (BLE) channel, a cellular based interface such as a Global System for Mobile (GSM) interface, a Code-Division Multiple Access (CDMA) interface, a Universal Mobile Telecommunications System (UMTS) interface, a Long-Term Evolution (LTE) interface, or another cellular based interface, or a combination thereof. Network channel 182 can be connected to an external network resource (not illustrated). The network resource can include another information handling system, a data storage system, another network, a grid management system, another suitable resource, or a combination thereof.

BMC 190 is connected to multiple elements of information handling system 100 via one or more management interface 192 to provide out-of-band monitoring, maintenance, and control of the elements of the information handling system. As such, BMC 190 represents a processing device different from processor 102 and processor 104, which provides various management functions for information handling system 100. For example, BMC 190 may be responsible for power management, cooling management, and the like. The term BMC is often used in the context of server systems, while in a consumer-level device a BMC may be referred to as an embedded controller (EC). A BMC included at a data storage system can be referred to as a storage enclosure processor. A BMC included at a chassis of a blade server can be referred to as a chassis management controller and embedded controllers included at the blades of the blade server can be referred to as blade management controllers. Capabilities and functions provided by BMC 190 can vary considerably based on the type of information handling system. BMC 190 can operate in accordance with an Intelligent Platform Management Interface (IPMI). Examples of BMC 190 include an Integrated Dell® Remote Access Controller (iDRAC).

Management interface 192 represents one or more out-of-band communication interfaces between BMC 190 and the elements of information handling system 100, and can include an Inter-Integrated Circuit (I2C) bus, a System Management Bus (SMBUS), a Power Management Bus (PMBUS), a Low Pin Count (LPC) interface, a serial bus such as a Universal Serial Bus (USB) or a Serial Peripheral Interface (SPI), a network interface such as an Ethernet interface, a high-speed serial data link such as a PCIe interface, a Network Controller Sideband Interface (NC-SI), or the like. As used herein, out-of-band access refers to operations performed apart from a BIOS/operating system execution environment on information handling system 100, that is apart from the execution of code by processors 102 and 104 and procedures that are implemented on the information handling system in response to the executed code.

BMC 190 operates to monitor and maintain system firmware, such as code stored in BIOS/EFI module 142, option ROMs for graphics adapter 130, disk controller 150, add-on resource 174, network interface 180, or other elements of information handling system 100, as needed or desired. In particular, BMC 190 includes a network interface 194 that can be connected to a remote management system to receive firmware updates, as needed or desired. Here, BMC 190 receives the firmware updates, stores the updates to a data storage device associated with the BMC, transfers the firmware updates to NV-RAM of the device or system that is the subject of the firmware update, thereby replacing the currently operating firmware associated with the device or system, and reboots information handling system, whereupon the device or system utilizes the updated firmware image.

BMC 190 utilizes various protocols and application programming interfaces (APIs) to direct and control the processes for monitoring and maintaining the system firmware. An example of a protocol or API for monitoring and maintaining the system firmware includes a graphical user interface (GUI) associated with BMC 190, an interface defined by the Distributed Management Taskforce (DMTF) (such as a Web Services Management (WSMan) interface, a Management Component Transport Protocol (MCTP) or, a Redfish® interface), various vendor-defined interfaces (such as a Dell EMC Remote Access Controller Administrator (RACADM) utility, a Dell EMC OpenManage Enterprise, a Dell EMC OpenManage Server Administrator (OMSS) utility, a Dell EMC OpenManage Storage Services (OMSS) utility, or a Dell EMC OpenManage Deployment Toolkit (DTK) suite), a BIOS setup utility such as invoked by a "F2" boot option, or another protocol or API, as needed or desired.

In a particular embodiment, BMC 190 is included on a main circuit board (such as a baseboard, a motherboard, or any combination thereof) of information handling system 100 or is integrated onto another element of the information handling system such as chipset 110, or another suitable element, as needed or desired. As such, BMC 190 can be part of an integrated circuit or a chipset within information handling system 100. An example of BMC 190 includes an iDRAC or the like. BMC 190 may operate on a separate power plane from other resources in information handling system 100. Thus BMC 190 can communicate with the management system via network interface 194 while the resources of information handling system 100 are powered off. Here, information can be sent from the management system to BMC 190 and the information can be stored in a RAM or NV-RAM associated with the BMC. Information stored in the RAM may be lost after power-down of the power plane for BMC 190, while information stored in the NV-RAM may be saved through a power-down/power-up cycle of the power plane for the BMC.

Information handling system 100 can include additional components and additional busses, not shown for clarity. For example, information handling system 100 can include multiple processor cores, audio devices, and the like. While a particular arrangement of bus technologies and interconnections is illustrated for the purpose of example, one of skill will appreciate that the techniques disclosed herein are applicable to other system architectures. Information handling system 100 can include multiple central processing units (CPUs) and redundant bus controllers. One or more components can be integrated together. Information handling system 100 can include additional buses and bus protocols, for example, I2C and the like. Additional components of information handling system 100 can include one or more storage devices that can store machine-executable code, one or more communications ports for communicating with external devices, and various input and output (I/O) devices, such as a keyboard, a mouse, and a video display.

For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smartphone, a tablet device or other consumer electronic device, a network server, a network storage device, a switch, a router, or another network communication device, or any other suitable device and may vary in size, shape, performance, functionality, and price. Further, information handling system 100 can include processing resources for executing machine-executable code, such as processor 102, a programmable logic array (PLA), an embedded device such as a System-on-a-Chip (SoC), or other control logic hardware. Information handling system 100 can also include one or more computer-readable media for storing machine-executable code, such as software or data.

Due to reasons such as monitoring the performance of an information handling system which can degrade over time, telemetry such as those related to user behavior, hardware metrics, and diagnostics are usually collected for analysis. The analysis is performed to provide support, debug, assess current functions, and differentiated features of the information handling system to improve its performance. Generally, if there is a need or desire to expose a new hardware feature, software at a kernel space that retrieves some data from one or more hardware devices and sends it to a user application may be developed.

Certain APIs may be exposed in the kernel space with a driver that is communicatively coupled to the application and hardware resources to retrieve data. As hardware vendors continue to lock down access to their hardware resources, direct access to data associated with the hardware without disclosing its contents is becoming increasingly difficult. In addition, getting platform data for support and/or services is an issue today since enterprises may re-image the box which would delete the operating system agent responsible for collecting and exporting the telemetry data. To address these and other concerns, the present disclosure may provide secure bi-directional access to data such as platform data, telemetry data, user/operating system data, etc.

Figure 2:
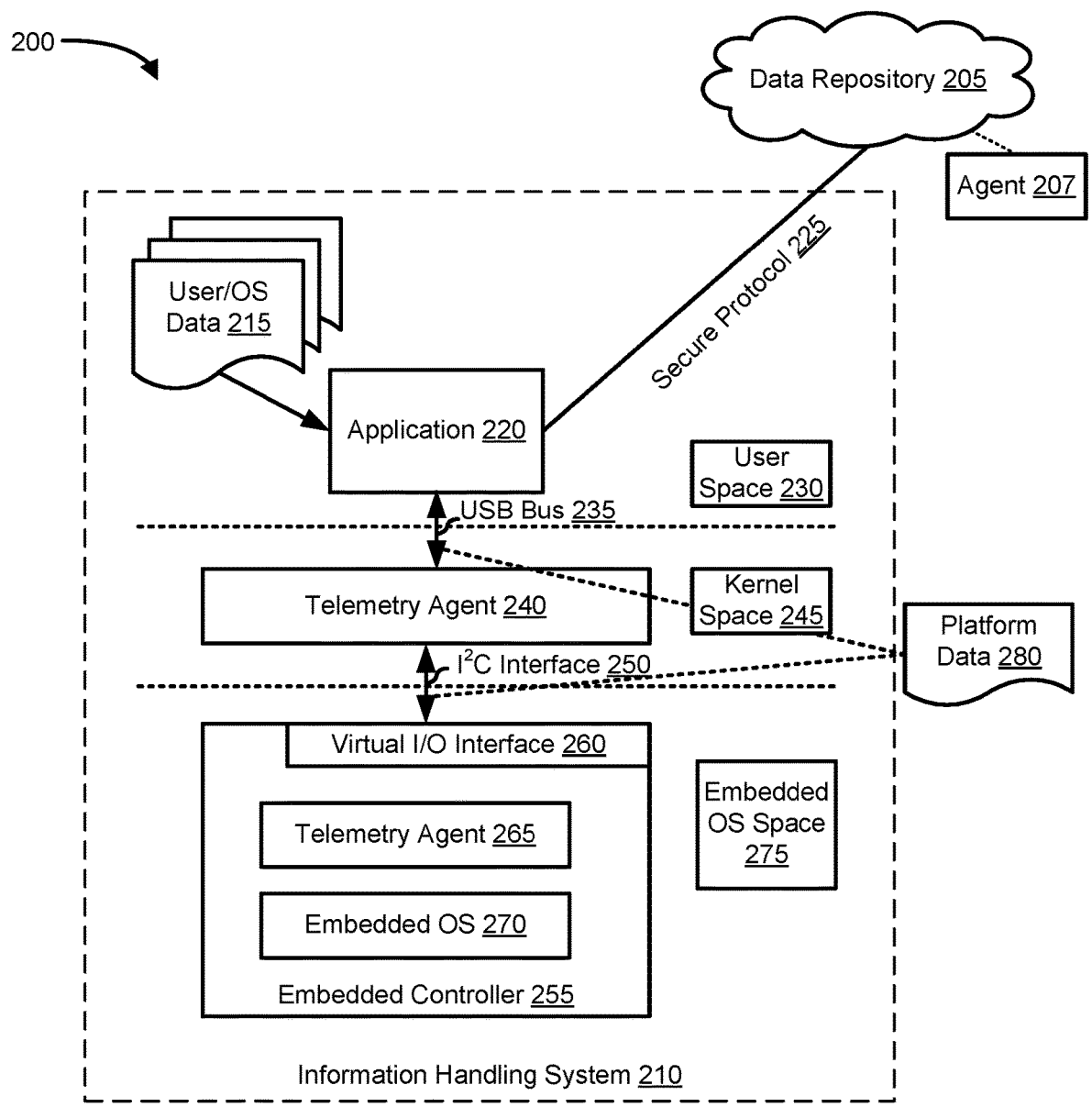
FIG. 2 is a block diagram illustrating an example of a system for operating system agnostic and secure bi-directional opaque data handling, according to an embodiment of the present disclosure.

FIG. 2 shows an example of a system 200 for in-band operating system agnostic opaque data handling. System 200 includes data repository 205 and an information handling system 210 which is similar to information handling system 100 of FIG. 1. Data repository 205 may be associated with an agent 207. Information handling system 210 includes a user space 230, a kernel space 245, and an embedded operating system space 275. User space 230 includes user/operating system data 215 and an application 220 which is communicatively coupled to data repository 205 via a secure protocol 225. Kernel space 245 includes a telemetry agent 240 which is communicatively coupled to application 220 via a USB bus 235. Embedded operating system space 275 includes an embedded controller 255 which is similar to BMC 190 of FIG. 1. Embedded controller 255 includes a virtual input/output interface 260, a telemetry agent 265, and an embedded operating system 270. Embedded controller 255 is communicatively coupled to telemetry agent 240 via I²C interface 250. The components of system 200 may be implemented in hardware, software, firmware, or any combination thereof. The components shown are not drawn to scale and system 200 may include additional or fewer components. In addition, connections between components may be omitted for descriptive clarity.

Embedded controller 255 may be configured to publish telemetry data such as platform data 280 over virtual input/output interface 260, which is a virtual in-band interface. Platform data 280 may include system data, hardware data, sensor data, etc. collected and/or stored during operation of information handling system 210 which can be used as a source of data reported to data repository 205. The telemetry data may be of an opaque data type. An opaque data type is a data type that is incompletely defined in an interface so that its values can only be manipulated by calling subroutines that have access to the missing information. In other words, an opaque data type does not have a data type associated with it such that it appears as basically a type of less data object.

The telemetry data may be collected by telemetry agents 240 and 265 which may be configured to collect telemetry data from one or more hardware components of the information handling system. To that extent, telemetry agents 240 and 265 may include functionality to periodically prompt one or more physical and/or logical sensors installed throughout the information handling system for data. Telemetry agents 240 and 265 may also include functionality to receive published and/or broadcasted data from one or more physical and/or logical sensors. In addition, telemetry agent 240 may be configured to receive platform data 280 from virtual input/output interface 260 via I²C interface 250. Telemetry agent 240 may be configured to listen to telemetry agent 265 to receive its data transmissions. Accordingly, telemetry agent 265 may be configured to transmit platform data 280 to telemetry agent 240 via virtual input/output interface 260 through I²C interface 250. Virtual input/output interface 260 may be a virtual human interface device coupled to embedded controller 255 and configured to transfer data from one or more components in embedded operating system space 275 such as telemetry agent 265 to telemetry agent 240 in kernel space 245. This allows for in-band management of information handling system 210.

Embedded operating system 270 may be configured to create virtual input/output interface 260 and a corresponding virtual driver upon boot of information handling system 210. Because virtual input/output interface 260 is a virtual USB human interface device located below kernel space 245, it does not have operating system dependency. As such, data collected and/or received by embedded controller 255 may be transmitted to data repository 205 via application 220 without a telemetry agent like when a user deletes the operating system of information handling system 210 thus removing the telemetry agent installed by the manufacturer of information handling system 210.

Application 220 may be a web application such as a progressive web application (PWA) which includes functionality to receive published and/or broadcasted data from telemetry agent 240 via USB bus 235, such as platform data 280. As such, application 220 may also be referred to as a user space agent. Application 220 may include functionality to transmit the received data, such as platform data 280, to data repository 205 via secure protocol 225 which may be configured to provide communications security over a network. For example, secure protocol 225 may include functionality that encrypts platform data 280 during transmission. Secure protocol 225 may be a transport layer security (TLS), secure sockets layer (SSL), or similar. Secure protocol 225 may use one or more security keys which could be symmetric security keys or asymmetrical security keys such as a private and public key of public key infrastructure (PKI).

Data repository 205 may be a data lake, a data warehouse, or similar which may be located locally or remotely of information handling system 210. For example, data repository 205 may be hosted in the cloud. Data repository 205 may be a central information handling system management data repository established by the information handling system vendor to store information handling system management data obtained from information handling systems in operation. Information in data repository 205 can be used in the implementation of monitoring and reporting the physical state of information handling system 210, extending basic system capabilities to support predictive health reporting and self-remediation, dynamic resource optimization, and adaptive behavior.

User/operating system data 215 may be of an opaque data type and includes system data, user data, operating system data, sensor data, etc. collected and/or stored during operation of information handling system 210 which can be used as a source of data reported to data repository 205. For example, user/operating system data 215 may include a customer's usage and device history that is reported and stored in a monitoring system data repository such as data repository 205. Detailed device and overall system conditions, event occurrences, and their severity can include, for example, data pertaining to power and duty cycle, system and individual device resource utilization profiles, thermal stress history, system off/storage conditions, mechanical stress counters, etc. may be reported for performance baseline determination. User/operating system data 215 may include data gathered and/or received by telemetry agent 265 and transmitted and stored at data repository 205.

Here, system 200 may be configured to having a virtual input/output interface 260 below kernel space 245 and user space 230 which hosts application 220. Embedded controller 255 can publish the data over a virtual USB human interface device such as virtual input/output interface 260 that can be attested with agent 207 for proper verification. Embedded controller 255 can be initially provisioned with a key that will be used to encrypt the data transmitted over the USB human interface device. The data may be verified by a cloud agent associated with data repository 205 using a private key to decrypt the data.

Those of ordinary skill in the art will appreciate that the configuration, hardware, and/or software components of system 200 depicted in FIG. 2 may vary. For example, the illustrative components within system 200 are not intended to be exhaustive, but rather are representative to highlight components that can be utilized to implement aspects of the present disclosure. Other devices and/or components may be used in addition to or in place of the devices/components depicted. The depicted example does not convey or imply any architectural or other limitations with respect to the presently described embodiments and/or the general disclosure. For example, although system 200 shows two telemetry agents, system 200 may be configured with one telemetry agent that can either be in kernel space 245 or embedded operating system space 275. In the discussion of the figures, reference may also be made to components illustrated in other figures for continuity of the description.

Figure 3:
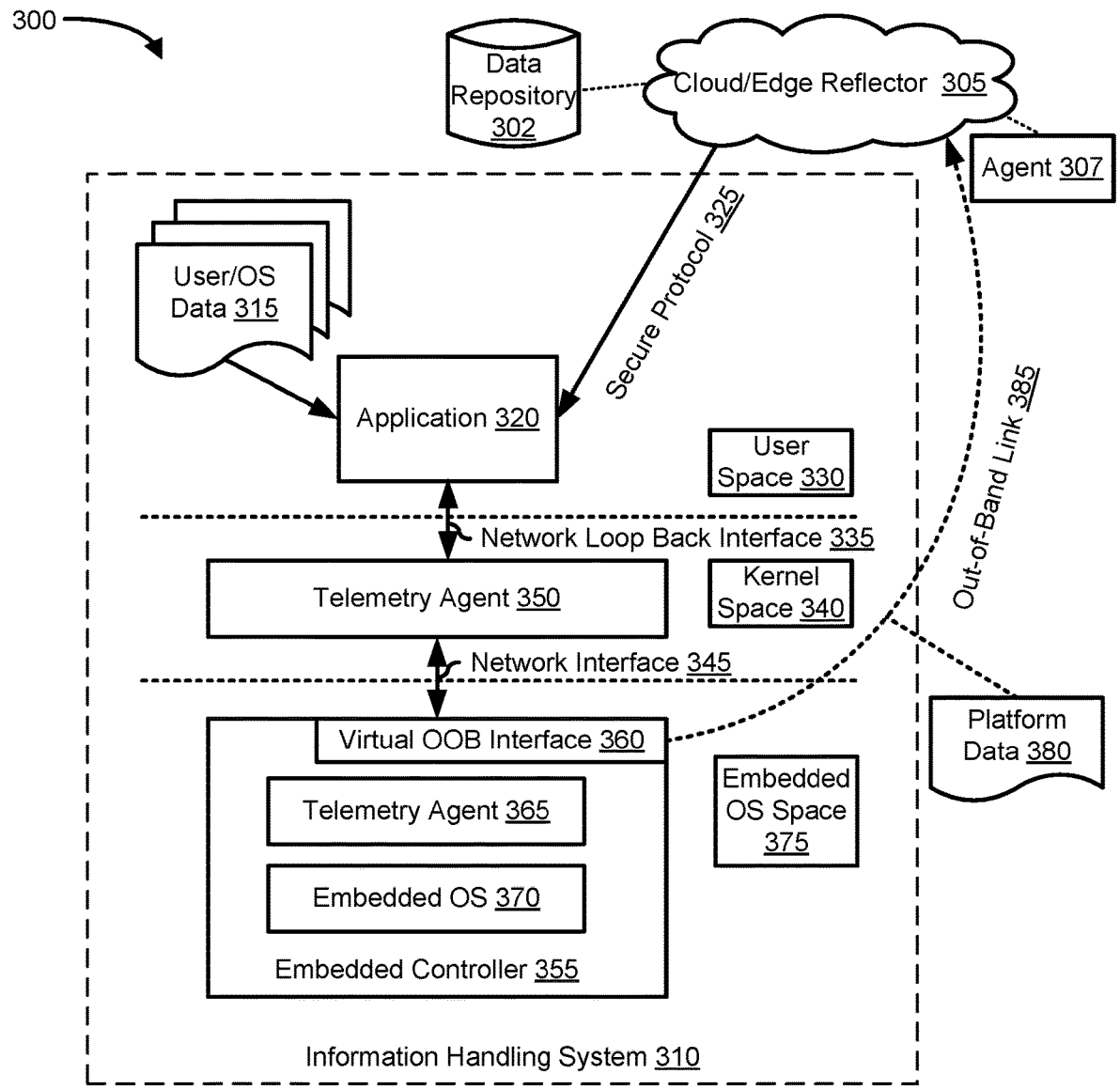
FIG. 3 is a block diagram illustrating an example of a system for operating system agnostic and secure bi-directional opaque data handling, according to an embodiment of the present disclosure.

FIG. 3 shows an example of a system 300 for out-of-band operating system agnostic opaque data handling. System 300 is similar to system 200 of FIG. 2 and includes a cloud/edge reflector 305 and an information handling system 310 which is similar to information handling system 100 of FIG. 1. Cloud/edge reflector 305 is associated with an agent 307 and a data repository 302 which similar to data repository 205 of FIG. 2. Information handling system 310 includes a user space 330, a kernel space 340, and an embedded operating system space 375. User space 330 includes user/operating system data 315 and an application 320 which is communicatively coupled to cloud/edge reflector 305 via secure protocol 325. Kernel space 340 includes a telemetry agent 350 which is communicatively coupled to application 320 via a network loopback interface 335. Telemetry agent 350 is also communicatively coupled to virtual out-of-band interface 360 via network interface 345. Embedded operating system space 375 includes an embedded controller 355 which further includes a virtual out-of-band interface 360, a telemetry agent 365, and an embedded operating system 370. Virtual out-of-band interface 360 is communicatively coupled to cloud/edge reflector 305 via out-of-band link 385. The components of system 300 may be implemented in hardware, software, firmware, or any combination thereof. The components shown are not drawn to scale and system 300 may include additional or fewer components. In addition, connections between components may be omitted for descriptive clarity.

System 300 is similar to system 200 of FIG. 2. As such, one or more components of system 300 may be similar to one or more components of system 200. For example, embedded controller 355 is similar to embedded controller 255 while telemetry agents 350 and 365 are similar to telemetry agents 240 and 265 respectively of FIG. 2. Embedded operating system 370 is similar to embedded operating system 270 while application 320 is similar to application 220 of FIG. 2.

Embedded controller 355 may create out-of-band interface 360 which is configured to permit the transmission of telemetry data, such as platform data 380, from embedded operating system space 375 to cloud/edge reflector 305 also referred to as a cloud router via a virtual out-of-band interface 360. Cloud/edge reflector 305 may be communicatively coupled to cloud data storage similar to data repository 205, wherein data received by cloud/edge reflector 305 is then stored at the cloud storage.

Embedded controller 355 may be configured to publish data over out-of-band interface 360. Out-of-band interface 360 will then bridge the data back to the network interface of the device. For example, out-of-band interface 360 may bridge the data back using network interface 345 via network loopback interface 335 which can be consumed by the operating system agent, such as telemetry agent 350 and/or application 320. The bi-directional data transfer can be performed using one or more ways, such as with user space application, such as with application 320 which loop back with out-of-band interface 360, with an interface of out-of-band interface 360, and with cloud/edge reflector 305. Out-of-band interface 360 which is located in embedded controller 355 below kernel space 340 can communicate with cloud/edge reflector 305 and publish data over a private port and transmit data to a cloud console and looped back to information handling system 310 via secure protocol 325 and/or network loopback interface 335.

Figure 4:
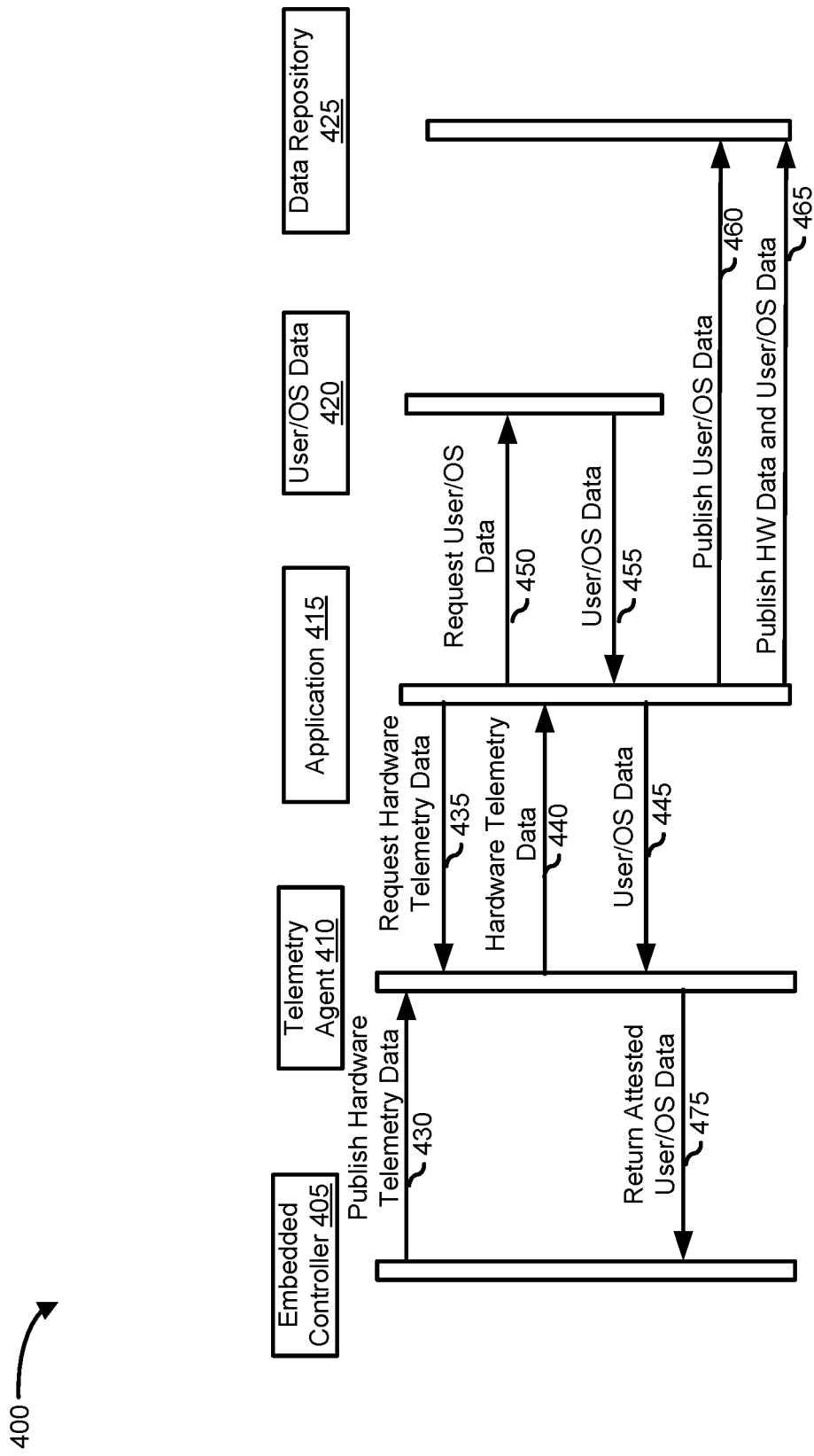
FIG. 4 is a diagram illustrating a data flow for operating system agnostic and secure bi-directional opaque data handling, according to an embodiment of the present disclosure.

FIG. 4 shows a diagram 400 illustrating the data flow of the process for operating system agnostic bi-directional data handling. The diagram illustrates the data flow using an in-band and out-of-band process which allows for transporting real-time telemetry data below the kernel space. This allows to securely expose and attest the telemetry data agnostic of the operating system to a user space agent or application. If the embedded controller has the configuration to both use in-band and out-of-band processes in handling the data, the embedded controller may determine which of the two processes may be used first based on priority, availability, or pre-determined setting.

The process involves an embedded controller 405, a telemetry agent 410, an application 415, user/operating system data 420, and data repository 425. Embedded controller 405 is similar to embedded controller 255 and embedded controller 355. Telemetry agent 410 may be similar to telemetry agent 240 and telemetry agent 350. Telemetry agent 410 may also be similar to telemetry agent 265 and telemetry agent 365. Application 415 is similar to application 220 and application 320. User/operating system data 420 is similar to user/operating system data 215 and user/operating system data 315. Data repository 425 is similar to data repository 205.

At 430, embedded controller 405 publishes hardware telemetry data to telemetry agent 410 which may be located at or below the kernel space of the information handling system. The hardware telemetry data may be collected or received from various components of the information handling system at published in real-time. At 435, telemetry agent 410 receives a request for telemetry data from an agent in the user space of the information handling system such as application 415. Telemetry agent 410 responds to the request by transmitting the hardware telemetry data, also referred to as platform data to application 415 at 440.

At 450, application 415 sends a request for user/operating system data 420 which may be stored at a data store local to the information handling system. At 455, a response to the request may be transmitted to application 415. The response may include the user/operating system data 420. At 460, application 415 may publish user/operating system data 420 to data repository 425 in real-time or at various intervals such as hourly, daily, etc. In another embodiment, at 465, application 415 may publish the hardware data with the user/operating system data 420 to data repository 425. Telemetry agent 410 may attest the operating system and/or user data and at 475 transmits the attested operating system and/or user data to embedded controller 405. Embedded controller 405 may publish the user/operating system data to data repository 425 using the out-of-band interface.

Figure 5:
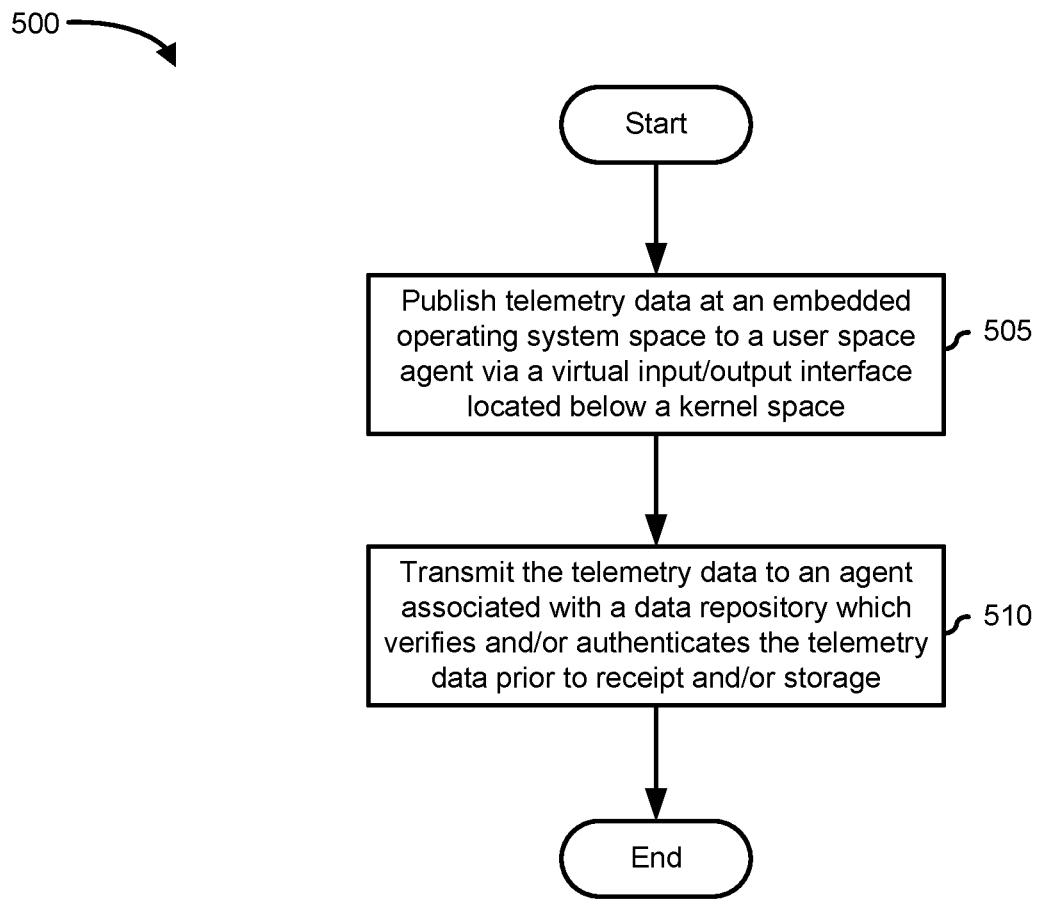
FIG. 5 is a flowchart illustrating a method for operating system agnostic and secure bi-directional opaque data handling, according to an embodiment of the present disclosure.

FIG. 5 shows a flowchart of a method 500 for in-band operating system agnostic and secure bi-directional data handling. While embodiments of the present disclosure are described in terms of system 200 FIG. 2 and diagram 400 of FIG. 4, it should be recognized that other systems may be utilized to perform the described method. One of skill in the art will appreciate that this flowchart explains a typical example, which can be extended to advanced applications or services in practice.

Method 500 typically starts at block 505 where telemetry data at an embedded operating system space is published to a user space agent via a virtual input/output interface located below a kernel space of an information handling system. The virtual input/output interface may be a virtual in-band USB human interface device. The information handling system may also include a user space agent with knowledge of a telemetry agent that can be located at or below the kernel space. The telemetry data can be published by an embedded controller over a virtual USB human interface device. In addition, the embedded controller can publish the telemetry data by encrypting it with a public key.

At block 510, the user space agent may transmit the telemetry data to an agent in the data repository via a secure network protocol. The data repository may be in the cloud and the agent may be a cloud agent which can attest the telemetry data for verification before receiving and/or storing the telemetry data at the data repository. The private key pair of the public key may be used by the cloud agent in decrypting the telemetry data and/or attesting the telemetry data. The cloud agent may have been provisioned with the public key used to encrypt the telemetry data.

Figure 6:
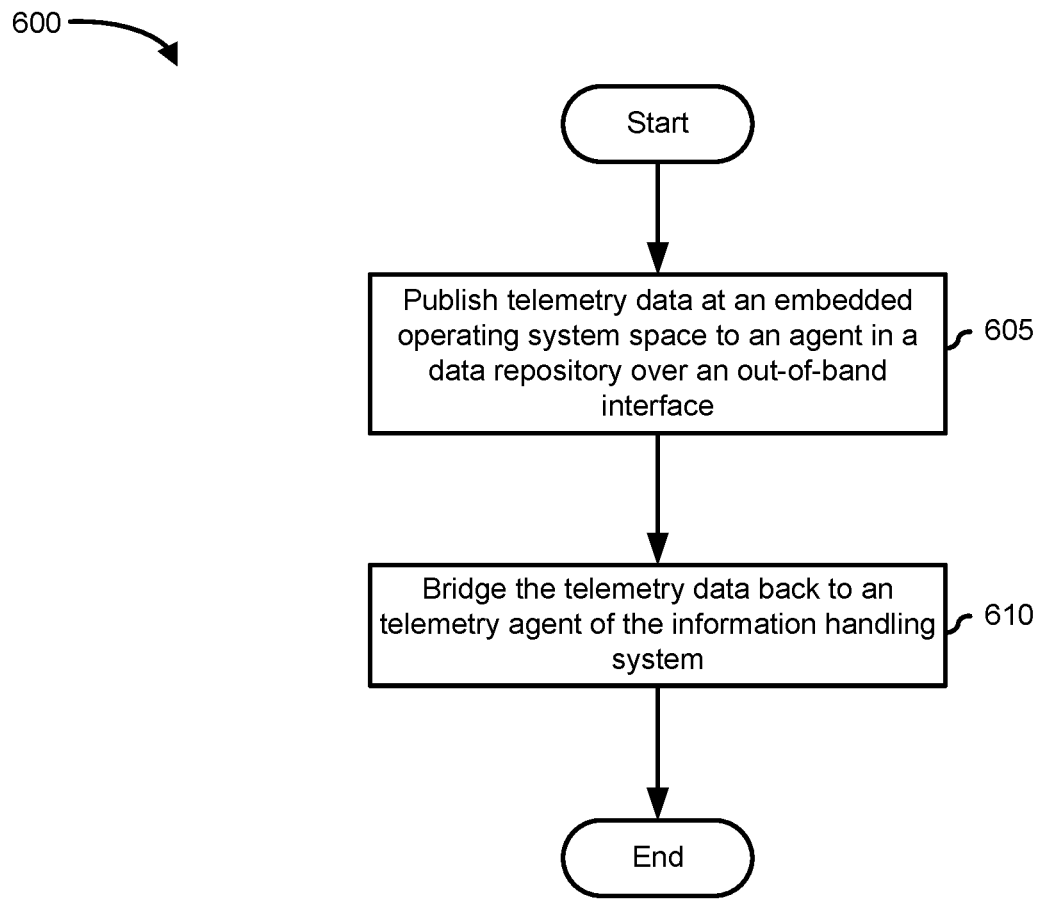
FIG. 6 is a flowchart illustrating an example of a method for operating system agnostic and secure bi-directional opaque data handling, according to an embodiment of the present disclosure.

FIG. 6 shows a flowchart of a method 600 for out-of-band operating system agnostic and secure bi-directional opaque data handling. While embodiments of the present disclosure are described in terms of system 300 FIG. 3 and diagram 400 of FIG. 4, it should be recognized that other systems may be utilized to perform the described method. One of skill in the art will appreciate that this flowchart explains a typical example, which can be extended to advanced applications or services in practice.

Method 600 typically starts at block 605 where telemetry data at an embedded operating system space is published to an agent associated with a data repository via an out-of-band interface located below a kernel space of an information handling system. Here, the telemetry data may be of opaque data type. At block 610, the out-of-band interface may then bridge the telemetry data back to the network interface of the information handling system which can be consumed by a telemetry agent located at the kernel space. The bridging back of the telemetry data may be performed using one of several methods such as by using an application in the user space of the information handling system which loops back with the out-of-band network interface. Another method may be using a web server interface in the embedded controller, wherein the web server can communicate over a private port, such as 8080, and user and/or operating system data can be transmitted from the user space to the embedded controller and the platform data such as hardware telemetry data can be transmitted from the embedded controller to the agent in the user space. In addition, a cloud and/or edge reflector may be used, wherein the telemetry data transmitted to the data repository can be looped back to the information handling system.

Although FIG. 5 and FIG. 6 show example blocks of method 500 and method 600 in some implementation, method 500 and method 600 may include additional blocks, fewer blocks, different blocks, or differently arranged blocks than those depicted in FIG. 5 and FIG. 6. Additionally, or alternatively, both blocks of method 500 and method 600 may be performed in parallel.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionalities as described herein.

The present disclosure contemplates a computer-readable medium that includes instructions or receives and executes instructions responsive to a propagated signal; so that a device connected to a network can communicate voice, video, or data over the network. Further, the instructions may be transmitted or received over the network via the network interface device.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or another storage device to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents but also equivalent structures.

What is claimed is:

1. An information handling system, comprising:
 a virtual interface configured to provide communication between an agent and an embedded controller, wherein the virtual interface is located below a kernel space of the information handling system;
 the agent may be configured to transmit telemetry data published by the embedded controller to a data repository, wherein the agent is located at a user space of the information handling system;
 the embedded controller configured to publish telemetry data to the data repository via the virtual interface through the agent; and
 a processor configured to monitor the information handling system based on the telemetry data stored at the data repository.

2. The information handling system of claim 1, wherein the telemetry data may be transmitted to an application via the virtual interface prior to the publish of the telemetry data to the data repository.

3. The information handling system of claim 1, wherein the virtual interface is a virtual input/output interface for in-band transmission of the telemetry data.

4. The information handling system of claim 3, wherein the virtual input/output interface is a virtual universal serial bus human interface device.

5. The information handling system of claim 1, wherein the virtual interface is an out-of-band interface for out-of-band transmission of the telemetry data.

6. The information handling system of claim 5, wherein the out-of-band interface is configured for bi-directional transfer of the telemetry data.

7. The information handling system of claim 1, wherein the telemetry data is of an opaque data type.

8. The information handling system of claim 1, wherein the telemetry data is encrypted.

9. The information handling system of claim 1, wherein the telemetry data is attested by a cloud agent for verification.

10. The information handling system of claim 1, wherein the telemetry data is decrypted by a cloud agent using a private key.

11. The information handling system of claim 1, wherein the embedded controller is configured to receive user data from the agent.

12. A method comprising:
providing, by a virtual interface, communication between an agent in a user space of an information handling system and an embedded controller, wherein the virtual interface is located below a kernel space of the information handling system;
publishing, by the embedded controller via the virtual interface, telemetry data for storage to a data repository;
transmitting the telemetry data to the data repository by the agent; and
monitoring the information handling system based on the telemetry data stored at the data repository.

13. The method of claim 12, wherein the virtual interface is a virtual input/output interface for in-band transmission of the telemetry data.

14. The method of claim 12, wherein the virtual interface is an out-of-band interface for out-of-band transmission of the telemetry data.

15. The method of claim 14, wherein the out-of-band interface is configured for a bi-directional transfer of the telemetry data.

16. The method of claim 15, wherein the bi-directional transfer of the telemetry data may be performed via a private port of a web server below the kernel space.

17. A non-transitory computer-readable medium including code that when executed performs a method, the method comprising:
providing, by a virtual interface, communication between an agent in a user space of an information handling system and an embedded controller, wherein the virtual interface is located below a kernel space of the information handling system;
publishing, by the embedded controller via the virtual interface, telemetry data for storage to a data repository;
transmitting the telemetry data to the data repository by the agent; and
monitoring the information handling system based on the telemetry data stored at the data repository.

18. The method of claim 17, wherein the virtual interface is a virtual input/output interface for in-band transmission of the telemetry data.

19. The method of claim 17, wherein the virtual interface is an out-of-band interface for out-of-band transmission of the telemetry data.

20. The method of claim 17, wherein the out-of-band interface is configured for bi-directional transfer of the telemetry data.

* * * * *